United States Patent Office 3,443,156
Patented May 6, 1969

3,443,156
CONTROL CIRCUIT FOR SWITCHING DEVICES PROTECTING CAPACITORS SERIES-CONNECTED IN HIGH VOLTAGE LINES
John William Gatiss and William John Joyce, Stafford, England, assignors to The English Electric Company Limited, and British Insulated Callender's Cables Limited, both of London, England, and both British companies
Filed Sept. 27, 1966, Ser. No. 582,301
Claims priority, application Great Britain, Sept. 27, 1965, 40,946/65
Int. Cl. H02h 7/16, 3/00
U.S. Cl. 317—12
9 Claims

ABSTRACT OF THE DISCLOSURE

This invention relates to a control circuit for switching devices protecting capacitors connected in series in multiphase high voltage lines. The switching devices comprise a spark gap adapted to break down immediately in response to an overvoltage so as to protect its associated capacitor and a "by-pass" switch provided subsequently to "short-out" the spark gap so as to relieve its duty if the overvoltage persists. In addition, the by-pass switch is closed in response to other faults affecting the line or the control circuit itself, e.g., a fall in pneumatic pressure, and a mechanism is further provided by which the operation of a switching device in one phase results in the operation of the corresponding switching devices in all the other phases.

---

This invention relates to a control device for controlling protective switching devices and particularly, but not necessarily exclusively, relates to the control of switching devices protecting capacitors connected in series in high voltage transmission lines.

Such capacitors are connected in series with the high voltage line to compensate for the inductance possessed by the line thereby to improve the power factor, reduce the losses and, in the case of two parallel lines, ensure correct current sharing. They may also be used to improve system stability when long lines are involved. These capacitors are conveniently mounted on insulators in banks, one bank per phase.

However, since these capacitors are connected in series with the line they are liable to be damaged by a fault current which may flow, the voltage developed across these capacitors being directly proportional to the current. Accordingly, these capacitors must be protected and this is effected by switching devices which can effectively switch them out of circuit upon the occurrence, for example, of a fault current in excess of a predetermined magnitude.

The present invention consists in a control device for protective switching devices in multi-phase transmission lines, comprising a plurality of relays associated with each phase respectively operable upon the occurrence of a like plurality of dissimilar faults affecting an associated one of said phases, a said switching device in the one phase being actuated in response to the operation of a said relay thereby to nullify the affect of the fault causing said operation, and a mechanism operable in response to the operation of said relay to actuate a corresponding switching device in all the other phases.

The protective switching devices may be switches which are connected in parallel with, and by-pass, other protective switches, e.g., of the spark gap type. An example of such a switch is the spark gap switch, incorporating gas blast techniques for extinguishing the arc, disclosed in patent application No. 40,948/65 bearing the title "Improvements in and Relating to Protective Switching Devices." With this type of protective switch it is desirable to provide a by-pass switching device to "short-out" the spark gap if the arc persists for a long time and also to take account of certain other contingencies attendant upon protective systems.

The use of a control device according to this invention for such protective switching devices is accordingly advantageous, as also is the feature by which the operation of the switching device on one phase results in operation of the corresponding switching devices on all the other phases since this avoids phase unbalance.

In order that the invention can be fully understood, one form of control device will now be described, by way of example, with reference to the accompanying drawings, in which.

Briefly, the control device according to this invention is designed to cause operation of the by-pass switches upon the energisation of any one of a number of relays associated with each phase and designed to operate in certain circumstances outlined below.

Figure 1:
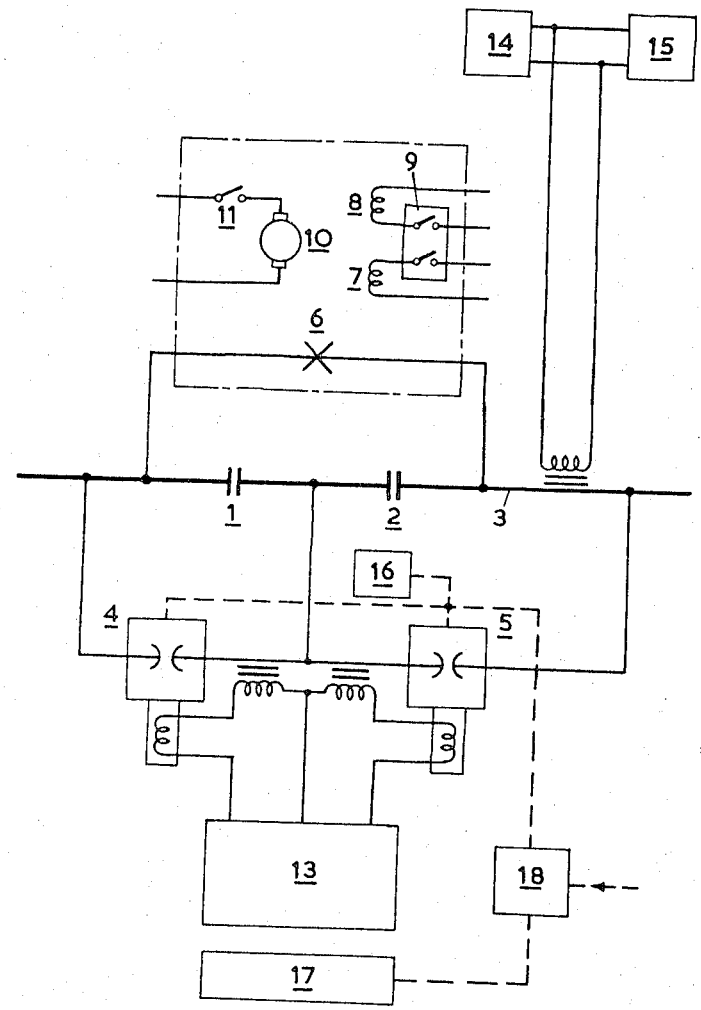
FIGURE 1 is a block diagram of a control device according to this invention connected in one phase of a three-phase transmission network.

Referring now to FIGURE 1, two capacitor banks 1 and 2 being protected are connected in series in a transmission line 3 carrying one phase of the supply, and two switching devices 4, 5 of the spark gap-gas blast type described in the above patent application are connected respectively across these capacitor banks. A single by-pass switch 6 is connected across both capacitor banks, and associated with this switch are a closing coil 7 and an opening coil 8 for this switch, a bi-contact auxiliary switch 9 operated by the by-pass switch and connected to these coils, a closing-spring charging motor 10 and a limit switch 11 operated by a closing-spring charging mechanism (not shown).

The relays, to which reference has already been made, comprise a definite time-delay relay 13 which is connected in circuit wtih an exhaust valve operating relay associated with each of the switching devices 4, 5 and operates in the event of current flowing through these devices for too long a period, an inverse time-delay relay 14 which operates to protect the capacitors from overheating in the event of a persistent over-current which is nevertheless of insufficient magnitude to cause the spark gap(s) in the switching device to break down; a relay 15 which operates in the event of the line current falling below a predetermined value, e.g., 33% of the normal value; and a relay 16 which is pressure-responsive and operates in the event of the air pressure within the switching devices falling below a specified value.

In addition, an interphase tripping mechanism 17 is associated with the switching devices on all the phases concerned and as mentioned above operates in a manner such that, if the by-pass switch on one phase closes, the by-pass switches on all the other phases are automatically closed. This mechanism is electro-pneumatically operated and is coupled to a source 18 of high pressure.

Figure 2:
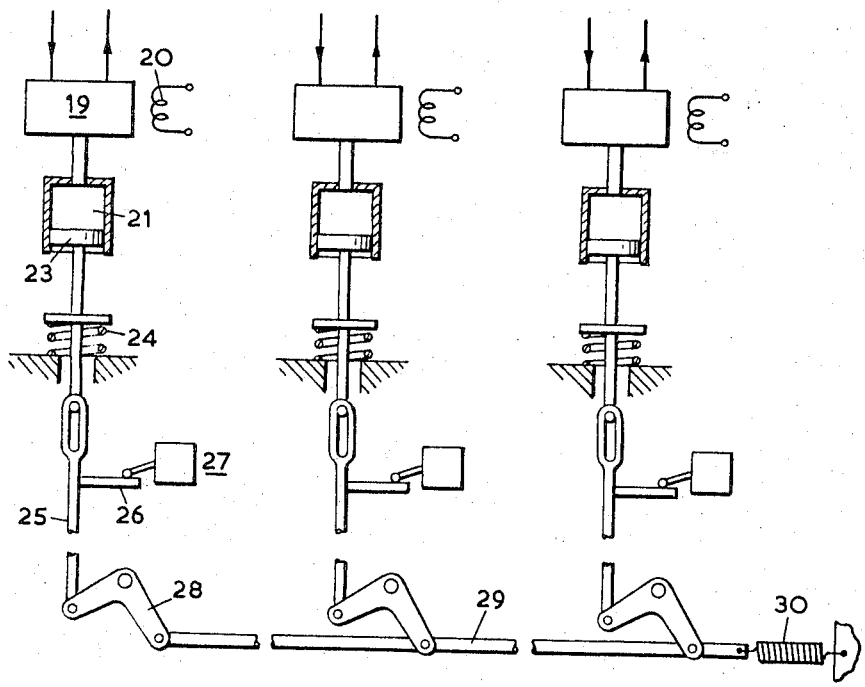
FIGURE 2 is a schematic diagram of an interphase tripping mechanism.

This mechanism is illustrated in FIGURE 2 and comprises three actuating devices respectively associated with each of three phases. Each device comprises an air valve 19 which is operated by a relay coil 20 selectively to connect an air cylinder 21 to the source 18 or to exhaust this cylinder. With the cylinder connected to high pressure, the pressure of the source normally biases a piston 23 against the restoring action of a spring 24, the end of this piston being freely movable along a slot in an insulated rod 25 depending therefrom. The rod 25 carries a laterally extending arm 26 which operates a bi-contact switch 27 (described below) and is connected at its lower end to a bell-crank lever 28. In turn, the bell-crank levers of all the devices are connected together by a coupling rod 29 which is connected to a spring 30. Thus, when the air cylinder 21 of a particular phase is exhausted, the piston 23 moves towards the cylinder head and carries with it the rod 25. This movement of the rod causes the two contacts in the switch 27 of this phase to open and, by rotating the bell-crank lever 28, causes the corresponding rods on the other two phases to rise and open the two contacts in the switch 27 associtaed with these phases, this latter movement being permitted by the "lost motion" slots in these rods.

Figure 3:
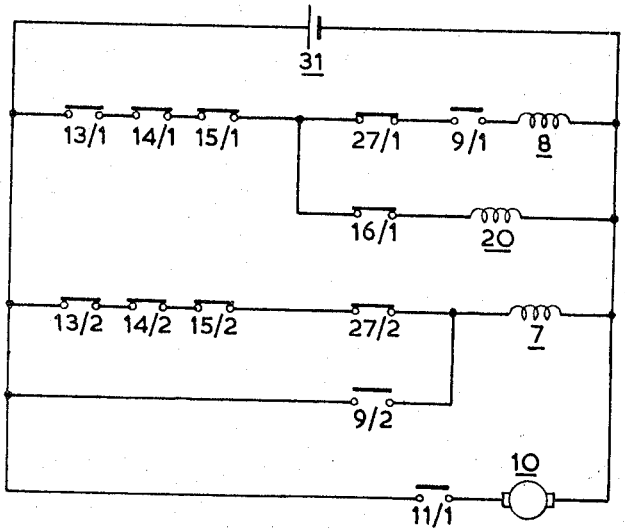
FIGURE 3 is a more detailed circuit diagram illustrating the manner in which the circuit elements shown in FIGURE 1 are interconnected.

Referring now to FIGURE 3, there is shown the control circuit for only one of the three phases. This control circuit is energised from a D.C. source 31 and includes three parallel-connected circuits. The first circuit comprises a chain of series connected phase relay contacts 13/1, 14/1 and 15/1, the inter-phase mechanism relay contacts 27/1, the auxiliary switch contacts 9/1 and the opening coil 8 of the by-pass switch and, in parallel with 27/1, 9/1 and 8, contacts 16/1 of the pressure responsive relay and the relay coil 20 of the air valve 19. The second circuit comprises a series chain of contacts 13/2, 14/2 and 15/2, the inter-phase mechanism relay contacts 27/2, and the closing coil 7 of the by-pass switch and, in parallel with relay contacts 13/2, 14/2, 15/2 and 27/2, contacts 9/2 of the auxiliary switch. The third circuit comprises the motor 10 connected in series with the limit switch contacts 11/1 for this motor.

As shown, in the absence of a fault which would cause the by-pass switch to close, all the relay contacts are normally closed except for contacts 9/1, 9/2 and 11/1.

Upon the fault being such that any one of the relays 13 to 15 is energised, the contacts 1 and 2 of the energised relay open and break the first and second circuits in the control circuit. In particular, the opening of the relevant contact 2 de-energises the closing coil 7, which is of the "no-volt" type, and this releases the closing spring (not shown) in the by-pass switch in the associated phase and causes this switch to close. At the same time, the opening of the relevant contact 1 de-energises the relay coil 20 which results in the air cylinder 21 being exhausted and the contacts 27/1 and 27/2 being opened on all phases in response to the resulting movement of the rods 25 in the inter-phase tripping mechanism. The no-volt type closing coils 7 on the other two phases (not shown) are accordingly de-energised and the by-pass switches on these other two phases close. The closure of the by-pass switches results in their auxiliary contacts 9/1 and 9/2 closing, and the limit switch contact 11/1 closing when the closing spring of the by-pass switch has been fully released, it being noted that the opening coil in the first circuit associated with the other two phases remains open by reason of contact 27/1 being broken. The closure of the limit switch contact causes the motor 10 to operate and "recharge," e.g., tension, this closing spring, and the closure of contact 9/2 re-energises the closing coil 7 so as to ensure that the by-pass switch is ready for any future fault, the limit switch contacts opening again upon the completion of the spring-charging.

A similar train of events is executed upon the energisation of relay 16, which causes contact 16/1 to open, resulting in de-energisation of coil 20 and hence operation of contacts 27/1 and 27/2. Opening of the contact 27/2 results in the by-pass switch closing. Since contact 27/1 opens wits contact 27/2, closure of auxiliary contact 9/1 does not result in re-opening of the by-pass switch until contact 27/11 is reclosed.

When the fault has been cleared or isolated, the relay concerned is de-energised thus completing the first circuit and energising the relay coil 20. The air cylinder 21 is accordingly again connected to the high pressure source and the rods 25 in the inter-phase tripping mechanism move and cause contacts 27/1 and 27/2 to close. Closure of contact 27/1 completes the first circuit in all phases whereupon the opening coil 8 is energised and causes the by-pass switches to open. Opening of the by-pass switches causes their auxiliary contacts 9/1 and 9/2 to open thus restoring the control circuit to its original condition.

In the event of a loss of, or serious reduction in, the D.C. from the power source in the control circuit in any phase the current through coil 20 will be insufficient to maintain the air valve in its correct position, and the air cylinder in the phase concerned will be exhausted whereupon the by-pass switches in all phases will close in response to contacts 27/1 and 27/2 being opened by rods 25. The restoration of the D.C. to the correct value will cause contacts 27/1 and 27/2 to close again whereupon the by-pass switches will open following the "opening" cycle of events described above.

A manual operation at ground level can also be incorporated by including means for moving the inter-phase rod 29 to the left against the restoring action of the spring 30 so as to operate (close) contacts 27/1 and 27/2. Key type interlocks may also be included at ground level operative in dependence on the position of the rod 29, and effective to prevent this rod moving to the right. When the by-pass switches have been closed these keys can be used to interlock with a by-pass isolator used to segregate the complete capacitor installation for maintenance purposes.

We claim:

1. A control device for protective switching devices in multiphase transmission lines, comprising
   a switching device associated with each phase,
   a plurality of relays associated with each phase respectively operable upon the occurrence of a like plurality of dissimilar faults affecting an associated one of said phases, a said switching device in the one phase being actuated in response to the operation of a said relay associated with that phase thereby to nullify the affect of the fault causing said operation, and
   a mechanism operable in response to the operation of said relay to actuate a corresponding switching device in all the other phases, said mechanism comprising
   a piston and cylinder associated with each phase,
   valve means for selectively connecting a said cylinder to a high pressure gas source and venting the cylinder to atmosphere in dependence on the operational state of any one of the said relays, whereby individually to displace the corresponding piston,
   resilient means for applying a restoring force to the piston against the action of the high pressure gas,
   an auxiliary switch operable by said piston to actuate its corresponding switching device, and
   a shaft commonly coupled to all the auxiliary switches, whereby, upon one auxiliary switch being operated by its corresponding piston associated with one phase all the auxiliary switches associated with all the other phases are operated in response to movement of the common shaft.

2. A control device for protective switching devices in multiphase transmission lines, comprising
   a switching device associated with each phase,
   a plurality of relays associated with each phase respectively operable upon the occurrence of a like plurality of dissimilar faults effecting an associated one of said phases, a said switching device in the one phase being actuated in response to the operation of a said relay associated with that phase thereby to nullify the affect of the fault causing said operation, and
   a mechanism operable in response to the operation of said relay to actuate a corresponding switching device in all the other phases, said mechanism comprising
a piston and cylinder associated with each phase,
valve means for selectively connecting a said cylinder to a high pressure gas source and venting the cylinder to atmosphere in dependence on the operational state of any one of the said relays, whereby individually to displace the corresponding piston,
resilient means for applying a restoring force to the piston against the action of the high pressure gas,
an auxiliary switch operable by said piston to actuate its corresponding switching device,
a shaft commonly coupled to all the auxiliary switches, and
a slotted link by which each piston is coupled to the common shaft, said slotted link being operative upon the associated auxiliary switch whereby, upon one of the cylinders being vented to atmosphere, the associated piston displaces its link to operate the auxiliary switch, the corresponding displacement of the other links by the common shaft being permitted by the last motion effected by these slotted links, so that upon one auxiliary switch being operated all the auxiliary switches associated with all the other phases are operated.

3. A control device according to claim 2, comprising
a first circuit connected to a power source, said first circuit including
a first normally-closed contact associated with each of said relays and
a coil connected in series therewith, said coil being operatively coupled to said valve means whereby said cylinder is selectively connected to the high pressure gas and vented to atmosphere in response to energisation and de-energisation, respectively, of said coil.

4. A control device according to claim 3, comprising
a second circuit connected in parallel with said first circuit, said first circuit including
a second normally-closed contact assoiated with each of said relays and
a further coil connected in series therewith, said further coil being associated with a said switching device and effective upon de-energisation to actuate said switching device.

5. A control device according to claim 4, wherein said switching device includes
two associated contacts adapted to be closed upon actuation thereof, one of said contacts being connected in series with the said first contacts of the relays and the other contact being connected in series with the said further coil, and
an additional coil connected in series with said first contacts, said additional coil being effective upon energisation to open said switching device.

6. A control device according to claim 5, wherein said auxiliary switch includes
a first normally-closed contact connected in series with the first contacts of said relays and
a second normally-closed contact connected in series with the second contacts of the relays, the first and second contacts of the auxiliary switch being opened in response to operation thereof by the displacement of the said slotted link.

7. A control device according to claim 3, further including
a relay operable in response to the pressure of said gas falling below a predetermined value, the relay having
a switch contact connected in series with said coil in the first circuit and effective to break said circuit and de-energise the coil in response to the operation of said relay.

8. A control device for protective switching devices associated with series-connected capacitors in multi-phase transmission lines, each of which devices is adapted to bridge a spark gap connected across a said capacitor and to break down in response to a predetermined voltage being developed thereacross, comprising
a switching device associated with each phase,
a plurality of relays associated with each phase and respectively operable upon the occurrence of a like plurality of dissimilar faults effecting the capacitors in an associated one of said phases,
a first circuit connected to a power source, said first circuit including
a first normally-closed contact associated with each of said relays, and
a coil connected in series therewith, said coil being effective upon energisation to open its associated switching device,
a second circuit connected in parallel with the first circuit and including
a second normally-closed contact associated with each of said relays, and
a further coil connected in series therewith, said further coil being associated with a said switching device and effective upon de-energisation in response to operation of any one of said relays to close said switching device and nullify the affect of the fault causing said operation, and
a pneumatic mechanism operable in response to the operation of said relay to actuate a corresponding switching device in all the other phases.

9. A control device according to claim 8, wherein one of said relays is operable in response to a persistent overcurrent in the line and another one of said relays is operable in response to the line current falling below a predetermined magnitude.

References Cited
UNITED STATES PATENTS

| | | | |
|---|---|---|---|
| 2,576,132 | 11/1951 | Marbury | 317—12 |
| 2,584,710 | 2/1952 | Johnson | 317—12 |
| 2,743,395 | 4/1956 | Marbury et al. | 317—12 |
| 3,249,813 | 5/1966 | Price et al. | 317—12 |
| 3,335,362 | 8/1967 | Cuttino | 317—12 |

JOHN F. COUCH, Primary Examiner.

R. V. LUPO, Assistant Examiner.

U.S. Cl. X.R.

317—46